US009692930B2

(12) United States Patent
Kimura

(10) Patent No.: US 9,692,930 B2
(45) Date of Patent: Jun. 27, 2017

(54) IMAGE PROCESSING APPARATUS THAT REDUCES MEMORY CAPACITY FOR AGGREGATING PLURALITY OF DOCUMENT IMAGES IN ONE SHEET

(71) Applicant: Kyocera Document Solutions Inc., Osaka (JP)

(72) Inventor: Kouichi Kimura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/574,195

(22) Filed: Dec. 17, 2014

(65) Prior Publication Data

US 2015/0172508 A1 Jun. 18, 2015

(30) Foreign Application Priority Data

Dec. 17, 2013 (JP) .................................. 2013-260574

(51) Int. Cl.
H04N 1/60 (2006.01)
H04N 1/21 (2006.01)
H04N 1/19 (2006.01)
H04N 1/41 (2006.01)

(52) U.S. Cl.
CPC ............. *H04N 1/2104* (2013.01); *H04N 1/19* (2013.01); *H04N 1/41* (2013.01); *H04N 2201/0081* (2013.01)

(58) Field of Classification Search
None
See application file for complete search history.

(56) References Cited

U.S. PATENT DOCUMENTS

| 7,061,640 B1* | 6/2006 | Maeda | ......................... 358/1.17 |
| 2002/0186403 A1* | 12/2002 | Okimoto | ................ H04N 1/411 |
| | | | 358/1.15 |
| 2005/0123206 A1* | 6/2005 | Sakai et al. | ................... 382/238 |

(Continued)

FOREIGN PATENT DOCUMENTS

| JP | H08-251318 A | 9/1996 |
| JP | 2001-030564 A | 2/2001 |
| JP | 2010-041383 A | 2/2010 |

OTHER PUBLICATIONS

Machine translation of JP Pub 2010041383 to Yokota Hiroshi.*

*Primary Examiner* — Benny Q Tieu
*Assistant Examiner* — Haris Sabah
(74) *Attorney, Agent, or Firm* — James W. Judge

(57) ABSTRACT

An image processing apparatus includes an image compressing unit, and a print-data generating unit. The image compressing unit divides the image of one page's worth of the document into each band region by a predetermined width in the sub-scanning direction and sets a rectangular region by a further division of each band region by a predetermined width in the main-scanning direction to generate rectangular compressed data. When the print-data generating unit generates the print data where a plurality of pages of document image are aggregated in one sheet, and an region in which the image does not exist occurs in a last page after the aggregation, the storing control unit complements the region in which the image does not exist in the rectangular compressed data storage unit using the white image data stored in the white image data storage unit.

4 Claims, 3 Drawing Sheets

(56) References Cited

U.S. PATENT DOCUMENTS

| | | | |
|---|---|---|---|
| 2007/0097434 A1* | 5/2007 | Tao | G06F 3/1208 |
| | | | 358/1.16 |
| 2007/0177225 A1* | 8/2007 | Morishita | 358/474 |
| 2010/0302581 A1* | 12/2010 | Yamazaki | G03G 15/234 |
| | | | 358/1.15 |
| 2011/0032552 A1* | 2/2011 | Ishii | H04N 1/41 |
| | | | 358/1.9 |

* cited by examiner

IMAGE PROCESSING APPARATUS THAT REDUCES MEMORY CAPACITY FOR AGGREGATING PLURALITY OF DOCUMENT IMAGES IN ONE SHEET

INCORPORATION BY REFERENCE

This application is based upon, and claims the benefit of priority from, corresponding Japanese Patent Application No. 2013-260574 filed in the Japan Patent Office on Dec. 17, 2013, the entire contents of which are incorporated herein by reference.

BACKGROUND

Unless otherwise indicated herein, the description in this section is not prior art to the claims in this application and is not admitted to be prior art by inclusion in this section.

In a general image processing apparatus such as a scanner, an image processing unit divides one sheet's worth of document image, which is read by an image reading unit, into band regions partitioned by a predetermined width each in a sub-scanning direction. Then, the image processing unit performs image processing such as a shading correction to each band region.

Further, the following method is described in this technique. In order to shorten process time of image compression, a white image determining unit determines whether or not an image in each band region is a uniform white image, and when the image is determined to be the white image, a preliminarily stored compressed white image is used.

SUMMARY

An image processing apparatus according to an aspect of the disclosure includes an image reading unit, an image compressing unit, a rectangular compressed data storage unit, a storing control unit, a print-data generating unit, and a white image data storage unit. The image reading unit includes a plurality of imaging elements disposed in a main-scanning direction and reads an image of one sheet's worth of a document while moving in a sub-scanning direction perpendicular to the main-scanning direction. The image compressing unit divides the image of one page's worth of the document read by the image reading unit into each band region by a predetermined width in the sub-scanning direction and sets a rectangular region by a further division of each band region by a predetermined width in the main-scanning direction to generate rectangular compressed data by the compression of each rectangular region using a predetermined method. The rectangular compressed data storage unit stores the rectangular compressed data. The storing control unit causes the rectangular compressed data to be stored in a corresponding region in the rectangular compressed data storage unit. The print-data generating unit expands the rectangular compressed data stored in the rectangular compressed data storage unit to generate one sheet's worth of print data. The white image data storage unit stores the white image data compressed in a predetermined compression format. When the print-data generating unit generates the print data where a plurality of pages of document image are aggregated in one sheet, and an region in which the image does not exist occurs in a last page after the aggregation, the storing control unit complements the region in which the image does not exist in the rectangular compressed data storage unit using the white image data stored in the white image data storage unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
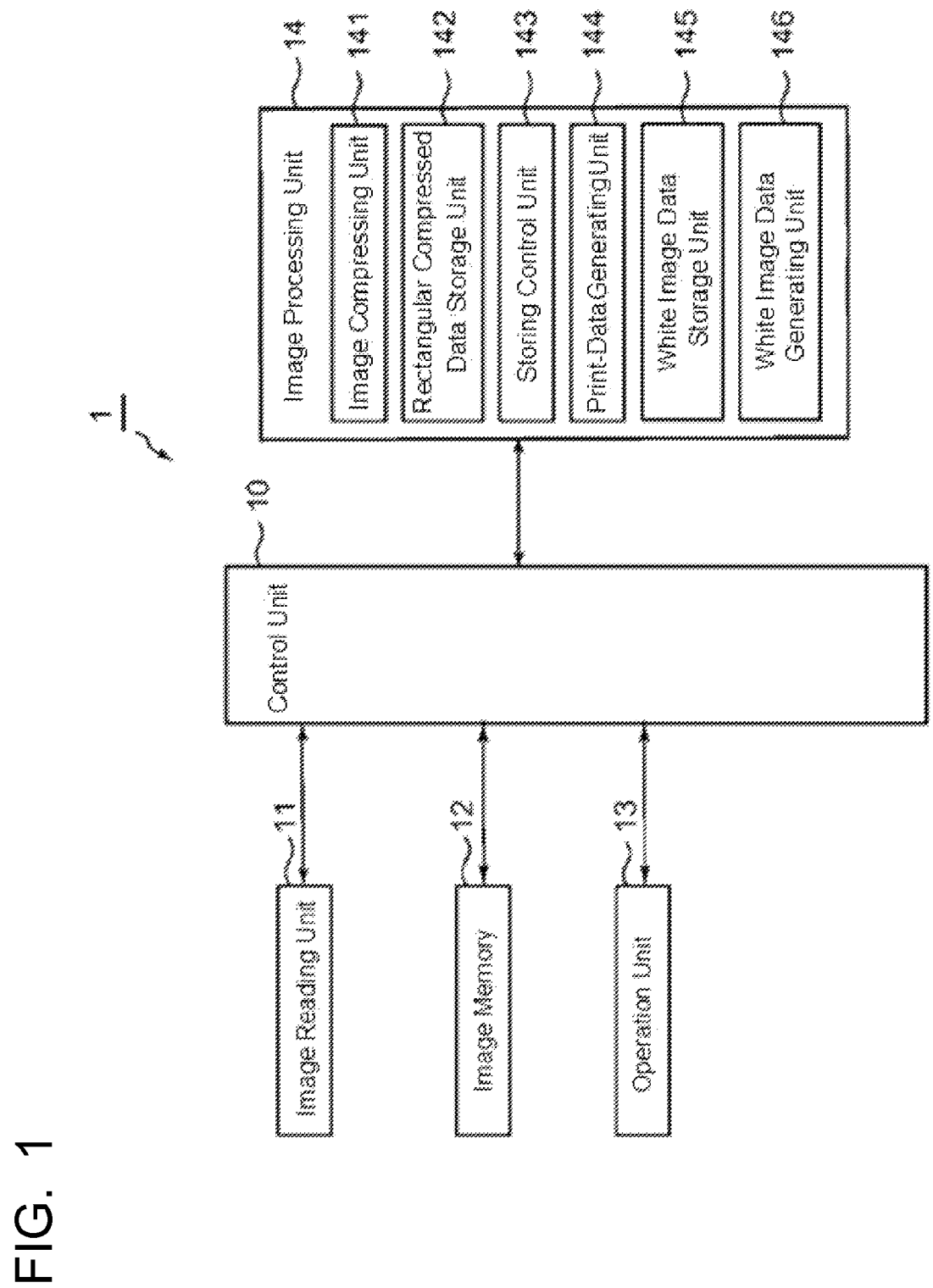
FIG. 1 illustrates a main internal configuration of an image reading apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image processing apparatus, an image reading apparatus, and an image forming apparatus according to one embodiment of the disclosure with reference to the drawings. Additionally, in the embodiment, the image reading apparatus is described as one example. However, for the embodiment, it may be the image processing apparatus and the image forming apparatus that includes the image reading apparatus. Further, the image reading apparatus according to the embodiment includes an aggregate function that puts together a plurality of document images in one sheet and is capable of reading a color image. Configuration and processing when the image reading apparatus handles the color image will be described.

FIG. 1 illustrates a function block diagram indicating a main internal configuration of an image reading apparatus 1. The image reading apparatus 1 includes a control unit 10, an image reading unit 11, an image memory 12, an operation unit 13 (a white image data change accepting unit), an image processing unit 14, and similar units.

The control unit 10 is configured with a Central Processing Unit (CPU), a RAM, a ROM, a dedicated hardware circuit and a similar component, and manages entire operation control of the image reading apparatus 1 by executing predetermined programs. The predetermined programs are stored in a non-transitory computer-readable recording medium. The image reading unit 11 includes a plurality of imaging elements disposed in a main-scanning direction and reads the document image by the plurality of imaging elements moving toward the sub-scanning direction that is perpendicular to the main-scanning direction. The image memory 12 temporarily stores the document image read by the image reading unit 11. The operation unit 13 accepts instructions from a user with respect to various kinds of performance and processing that are executable for the image reading apparatus 1.

The image processing unit 14 performs image processing such as image compression, an image quality adjustment, and enlargement/reduction with respect to the document image stored in the image memory 12. The image processing unit 14 includes an image compressing unit 141, a rectangular compressed data storage unit 142, a storing control unit 143, a print-data generating unit 144, a white image data storage unit 145, and a white image data generating unit 146.

The image compressing unit 141 partitions the document image where the image memory 12 stores and compresses the document image by a predetermined compression method (for example, JPEG compression). The process of the image compressing unit 141 will be described specifically with the use of FIG. 2.

Figure 2:
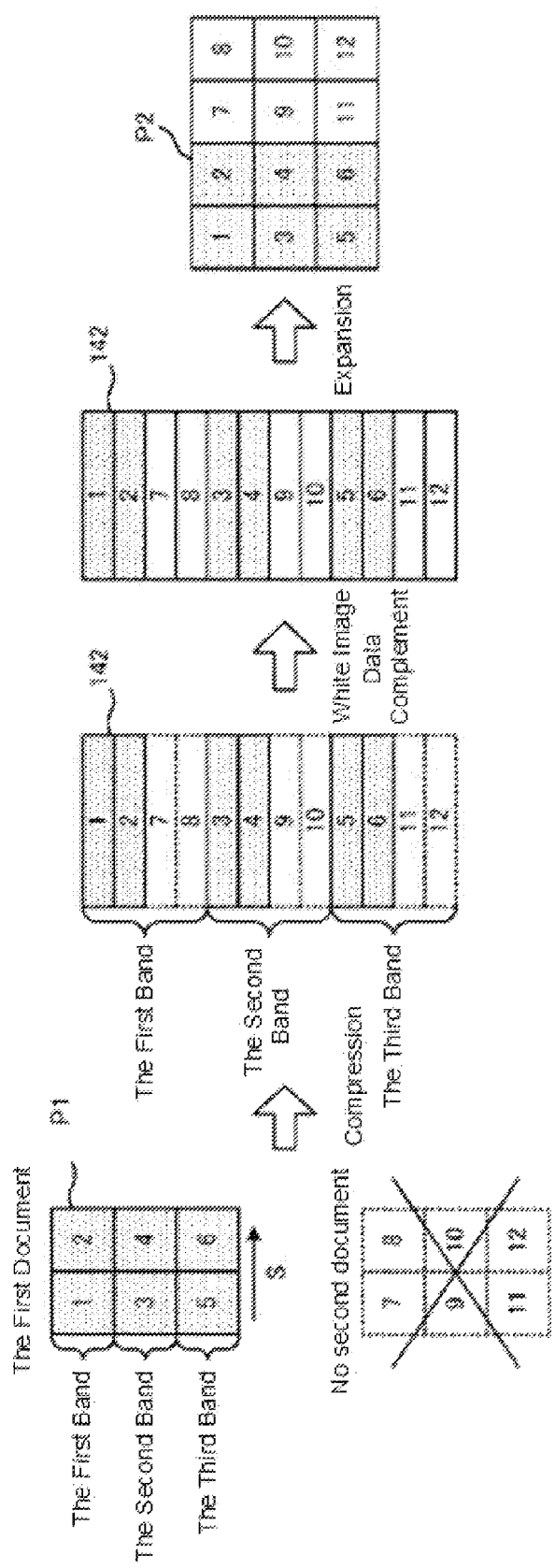
FIG. 2 illustrates a dividing method of a document image and a storing method into a rectangular compressed data storage unit according to the one embodiment.

FIG. 2 illustrates a dividing method of the document image and a storing method into the rectangular compressed data storage unit 142. The image compressing unit 141 divides a document image P1, which is one page's worth of a document stored in the image memory 12, into each band region with a predetermined width in the sub-scanning direction. In addition, the image compressing unit 141 further divides each band region of the document image P1 by a predetermined width in the main-scanning direction and partitions each band region into a rectangular region. FIG. 2 illustrates the case where the document image is partitioned into six rectangular regions. Then, the image compressing unit 141 compresses each rectangular region by a predetermined compression method and generates rectangular compressed data.

The storing control unit 143 determines a storage location of the rectangular compressed data in the rectangular compressed data storage unit 142, and outputs an instruction on the determined storage location to the rectangular compressed data storage unit 142. In response to the instruction, the rectangular compressed data storage unit 142 stores the rectangular compressed data.

Specifically, the storing control unit 143 causes the rectangular compressed data storage unit 142 to store the rectangular compressed data from the beginning address of the rectangular compressed data storage unit 142, in order from the rectangular compressed data in the first band of the document image P1. That is, a rectangular region 1 and a rectangular region 2 of the document image P1 correspond to the first band, and thus are stored from the beginning address of the rectangular compressed data storage unit 142. Furthermore, the rectangular region 1 and rectangular region 2 are stored according to the order along a main-scanning direction S of the document image P1, and thus are stored in the order of the rectangular region 1 and rectangular region 2.

Next, the storing control unit 143 causes the rectangular compressed data obtained by the compression of rectangular regions 3 and 4 in the second band of the document image P1 to be stored in the rectangular compressed data storage unit 142. Then, the storing control unit 143 causes the rectangular compressed data obtained by the compression of rectangular regions 5 and 6 in the third band of the document image P1 to be stored in the rectangular compressed data storage unit 142.

Further, when 2 in 1 (aggregation of two original documents in one sheet) is set by the use of an aggregate function, the storing control unit 143 causes the rectangular compressed data in the region of the first band of the second document image (rectangular regions 7 and 8 in FIG. 2) to be stored in the third and fourth region in the first band of the rectangular compressed data storage unit 142.

However, when there is not the second document image (for example, when the number of document images is the odd number, and the document image P1 is the last document), obviously the rectangular compressed data of the second document also does not exist. Therefore, no data is stored in the region where the rectangular regions 7 and 8 should be stored, and conventionally preliminarily stored white image data is complemented.

With conventional methods, complementing is with white image data in which quality and sampling rate are the same as those of the original document image. In the case of JPEG images, quality involves luminance (Y) and chrominance (U,V), each of which is established, for example, in a range of 0 to 100 . In addition, the sampling rate is configured in four schemes: YUV 4:4:4, YUV 4:2:2, YUV 4:2:0 and YUV 4:0:0. Considering these schemes, retaining white image data in 100 (luminance)×100(chrominance)×3(YUV 4:4:4, YUV 4:2:2, YUV 4:2:0)+100(luminance)×1(YUV 4:0:0)=30100 schemes would make it possible to cover all qualities and sampling rates.

However, storing, by band-region size, white image data of all qualities and sampling rates has required significant memory capacity.

Therefore, the white image data storage unit 145 stores only white image data (for example, a 20-scheme portion) of qualities and sampling rates whose occasions when used are frequent, and moreover, for which the compression process is performed not in band units but in rectangular-region units. Thus, the memory capacity necessary to hold the white image data can be reduced.

The white image data generating unit 146 stores the quality and sample rate of the white image data generated at activation of the image reading apparatus 1 into an internal memory (not illustrated). The internal memory stores a plurality of kinds of quality and sample rate with a high usage frequency and a predetermined number. Then, at activation of the image reading apparatus 1, the white image data generating unit 146 generates the white image data of each quality and sample rate stored in the white image data generating unit 146 in the size of the rectangular region and then performs the compression process. The white image data storage unit 145 stores the compressed white image data.

Furthermore, an operator can change the quality and sample rate stored in the white image data generating unit 146 at a maintenance mode or a similar mode of the image reading apparatus 1. When the operator inputs a change instruction of the quality and sample rate via the operation unit 13, the white image data generating unit 146 stores the input quality and sample rate. Then the white image data generating unit 146 generates the white image data according to the quality and sample rate and performs the compression process. The white image data storage unit 145 updates the compressed white image data and then stores.

Return to FIG. 2. The image processing unit 14 reads the white image data with the quality and sample rate closest to the quality and sample rate of the document image P1 from the white image data storage unit 145. Then the image processing unit 14 complements the regions in which the data does not exist in the rectangular compressed data storage unit 142 (rectangular regions 7 to 12).

Then, the print-data generating unit 144 expands the compressed data stored in the rectangular compressed data storage unit 142 and generates one sheet's worth of print data P2. At this time, as illustrated in FIG. 2, the print data P2 is an aggregated image where two pages of document are aggregated into one sheet. For example, the left half is the image of the first page, and the right half is the white image (a blank sheet) because the second page is the blank sheet.

Figure 3:
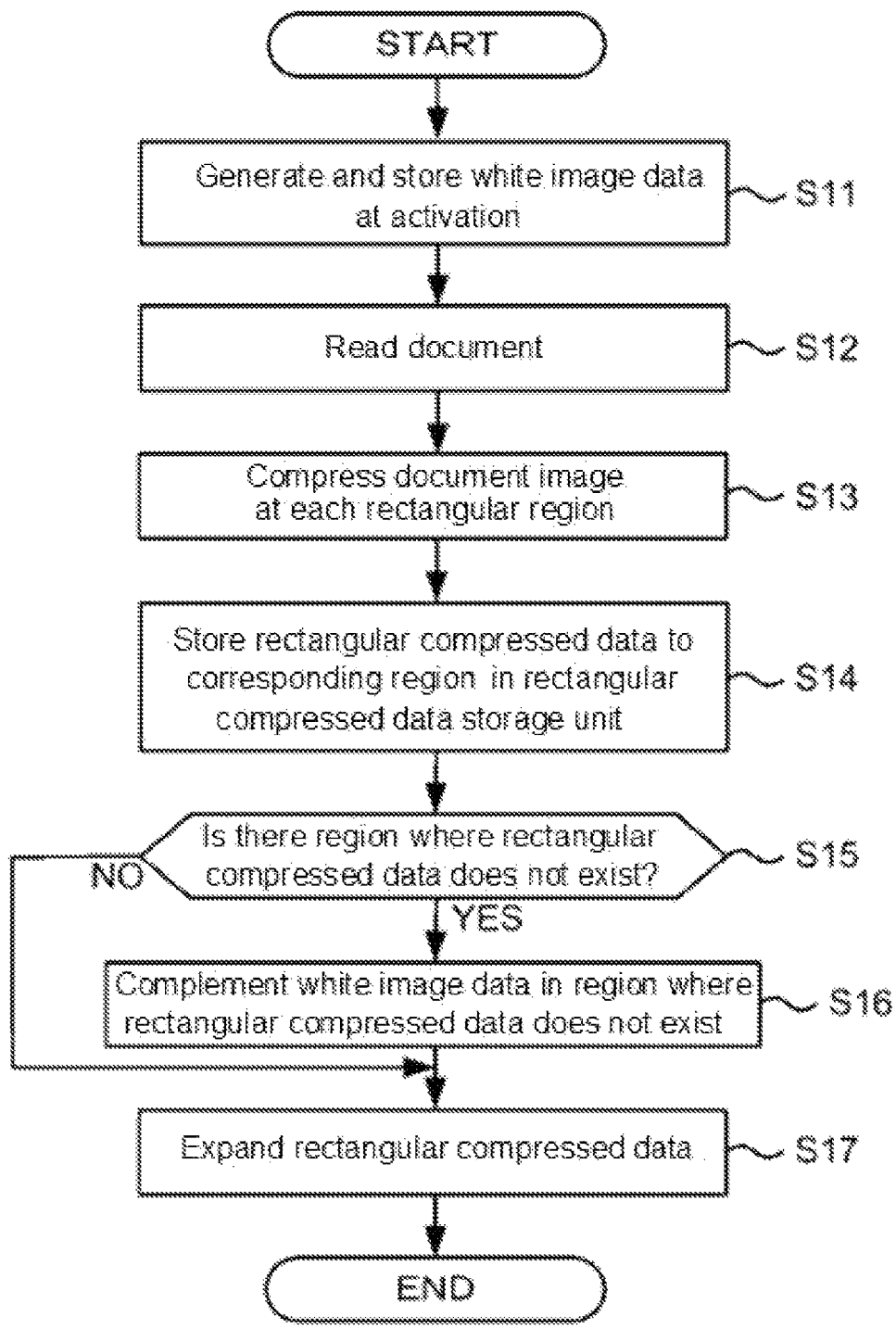
FIG. 3 illustrates a flow of an image compression process according to the one embodiment.

FIG. 3 is a flow chart illustrating a flow of an image compression process according to the embodiment. First, the white image data generating unit 146 performs the generation and compression processes of the white image data at activation of the image reading apparatus 1, and the white image data storage unit 145 stores the white image data (Step S11).

In addition, at the maintenance mode, when the quality and the sample rate stored in the white image data storage unit 145 are changed, the white image data generating unit 146 generates and compresses the white image data according to the changed quality and sample rate. Immediately afterward the white image data storage unit 145 stores the white image data generated and compressed above.

Next, after the image reading unit 11 reads the document (Step S12), the image compressing unit 141 separates the document image into the band regions. Further, the image compressing unit 141 divides the band region by the predetermined width in the main-scanning direction and set the rectangular regions. Then, the image compressing unit 141 performs the compression process on each rectangular region to generate the rectangular compressed data (Step S13).

Next, the storing control unit 143 causes the rectangular compressed data, which is compressed by the image compressing unit 141, to be stored in the corresponding region in the rectangular compressed data storage unit 142. The storing order is described above.

Then, when the aggregate function is set, and the number of the document is the odd number, there exists a region without the rectangular compressed data in the rectangular compressed data storage unit 142. In this case (Step S15; YES), the storing control unit 143 reads the white image data having the quality and sample rate close to the quality and sample rate of the document image from the white image data storage unit 145 . Then the storing control unit 143 complements the white image data to the empty region in the rectangular compressed data storage unit 142 (Step S16).

Then, the print-data generating unit 144 expands the compressed data stored in the rectangular compressed data storage unit 142 to generate print data (Step S17).

As described above, when the aggregate function is employed, the white image data storage unit 145 stores the white image data used for a data complement by the limitation of the white image data to the white image data with the predetermined kind of quality and sample rate with a high usage frequency. Thus, the amount of memory for the white image data storage unit 145 can be reduced.

In addition, conventionally the white image data is held in each band region. However, the amount of memory can be further reduced by the storage in units of the rectangular region smaller than the band region.

Furthermore, in the above, the case where the image reading apparatus 1 as one embodiment of the disclosure processes the color image is described as an example. The disclosure is not limited to this and includes also the embodiment of the image reading apparatus 1 that handles a monochrome image data.

When the image reading apparatus 1 also handles monochrome image data, the image reading apparatus 1 includes the above-described configuration for the process in the handling of the color image and performs the processes similar to the processes described above. However, the followings are different.

The above configuration described as the image reading apparatus 1 that handles the color image includes the white image data generating unit 146. However, the image reading apparatus 1 is not required to include the white image data generating unit 146 in the processing of the monochrome image data. In the processing of the monochrome image data, the white image data compressed in a predetermined compression format, for example, one pattern of JBIG system is stored in the white image data storage unit 145. In the generation process of the print data by the compression process to each rectangular region described above, in the case of the monochrome image data, the storing control unit 143 performs as follows: the storing control unit 143 reads the white image data from the white image data storage unit 145 and then complements the white image data to the empty region in the rectangular compressed data storage unit 142. Thus, in the image reading apparatus 1 that handles the color image, the preliminarily held white image data can be used even when a plurality of document images are aggregated. At the same time, the memory capacity required to hold the white image data can be reduced.

While various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

What is claimed is:

1. An image processing apparatus, comprising: an image reading unit that includes a plurality of imaging elements disposed in a main-scanning direction, and that by moving in a sub-scanning direction perpendicular to the main-scanning direction captures in sheet units image data from document pages, the image reading unit having an aggregating function whereby the image reading unit puts together a plurality of document pages into a single sheet;

an image compressing unit that divides the image data of a single sheet unit of a document read by the image reading unit into each of band regions having a predetermined width in the sub-scanning direction, and establishes rectangular regions by further dividing the band regions by each of predetermined widths in the main-scanning direction, to generate rectangular compression data by compressing each rectangular region according to a predetermined method defining a given document-image number of image-data quality and sampling-rate schemes;

a rectangular compression data storage unit for storing the rectangular compression data;

a storing control unit that causes the rectangular compression data to be stored in corresponding regions of the rectangular compression data storage unit;

a print-data generating unit that expands the rectangular compression data stored in the rectangular compression data storage unit to generate print data in single-page units;

a white image data storage unit; and a white image data generating unit that generates white-image complementing data in units of the rectangular regions into which the image compressing unit divides the band regions, according to a white-image complementing number of image-data quality and sampling-rate schemes predetermined according to high usage frequency, the white-image complementing number therein being less than the given document-image number of image-data quality and the sampling-rate schemes, and compresses the white-image complementing data according to a predetermined compression format, and stores the compressed white-image complementing data in the white image data storage unit; wherein in the rectangular compression data storage unit, when a rectangular region in which the image data is not present occurs in single-sheet image data having the plurality of the document pages aggregated by the aggregating function of the image reading unit, the storing control unit complements the rectangular region with the compressed white-image complementing data stored in the white image data storage unit.

2. The image processing apparatus according to claim 1, further comprising:

a white image data change accepting unit that accepts changes to the image-data quality and the sampling-rate schemes for the white image data generated by the white image data generating unit; wherein when the white image data change accepting unit accepts a change to the image-data quality and the sampling-rate scheme, the white image data generating unit generates the white image data according to the image-data quality and the sampling-rate scheme accepted by the white image data change accepting unit.

3. An image processing method, comprising:

moving, in a sub-scanning direction, a plurality of image-reading-unit imaging elements disposed in a main-scanning direction to capture, in sheet units, image data from document pages, the image reading unit having an aggregating function whereby the image reading unit puts together a plurality of document pages into a single sheet;

dividing the image data of the single sheet unit of a document read by the image reading unit into each of band regions having a predetermined width in the sub-scanning direction, and establishing rectangular regions by further dividing the band regions by each of the predetermined widths in the main-scanning direction, to generate rectangular compression data by compressing each rectangular region according to a predetermined method defining a given document-image number of image-data quality and sampling-rate schemes;

causing the rectangular compression data to be stored in corresponding regions of a rectangular compression data storage unit;

expanding the rectangular compression data stored in the rectangular compression data storage unit to generate print data in single-page units;

generating white-image complementing data in units of the rectangular regions into which an image compressing unit divides the band regions, according to a white-image complementing number of the image-data quality and the sampling-rate schemes predetermined according to high usage frequency, the white-image complementing number therein being less than the given document-image number of the image-data quality and the sampling-rate schemes, and compressing the white-image complementing data according to a predetermined compression format; and storing the compressed white-image complementing data; wherein in the rectangular compression data storage unit, when a rectangular region in which the image data is not present occurs in single-sheet image data having the plurality of document pages aggregated by the aggregating function of the image reading unit, the causing the rectangular compressed data to be stored complements the rectangular region with the stored compressed white-image complementing data.

4. A non-transitory computer-readable recording medium storing an image processing program for controlling an image processing apparatus, the image processing program causing the image processing apparatus to function as:

an image reading unit that includes a plurality of imaging elements disposed in a main-scanning direction, and that by moving in a sub-scanning direction perpendicular to the main-scanning direction captures in sheet units image data from document pages, the image reading unit having an aggregating function whereby the image reading unit puts together a plurality of document pages into a single sheet;

an image compressing unit that divides the image data of a single sheet unit of a document read by the image reading unit into each of band regions having a predetermined width in the sub-scanning direction, and establishes rectangular regions by further dividing the band regions by each of the predetermined widths in the main-scanning direction, to generate rectangular compression data by compressing the each rectangular region according to a predetermined method defining a given document-image number of image-data quality and sampling-rate schemes;

a rectangular compression data storage unit for storing the rectangular compression data;

a storing control unit that causes the rectangular compression data to be stored in corresponding regions of the rectangular compression data storage unit;

a print-data generating unit that expands the rectangular compression data stored in the rectangular compression data storage unit to generate print data in single-page units;

a white image data storage unit; and a white image data generating unit that generates white-image complementing data in units of the rectangular regions into which the image compressing unit divides the band regions, according to a white-image complementing number of image-data the quality and the sampling-rate schemes predetermined according to high usage frequency, the white-image complementing number therein being less than the given document-image number of the image-data quality and the sampling-rate schemes, and compresses the white-image complementing data according to a predetermined compression format, and stores the compressed white-image complementing data in the white image data storage unit; wherein in the rectangular compression data storage unit, when a rectangular region in which the image data is not present occurs in single-sheet image data having the plurality of document pages aggregated by the aggregating function of the image reading unit, the storing control unit complements the rectangular region with the compressed white-image complementing data stored in the white image data storage unit.

* * * * *